(12) United States Patent
Gunasekara

(10) Patent No.: US 7,965,721 B1
(45) Date of Patent: Jun. 21, 2011

(54) SYSTEM AND METHOD OF TRANSFERRING COMMUNICATIONS BETWEEN NETWORKS

(75) Inventor: Don Gunasekara, Reston, VA (US)

(73) Assignee: Nextel Communications Inc., Reston, VA (US)

( * ) Notice: Subject to any disclaimer, the term of this patent is extended or adjusted under 35 U.S.C. 154(b) by 223 days.

(21) Appl. No.: 12/052,903

(22) Filed: Mar. 21, 2008

(51) Int. Cl.
*H04L 12/28* (2006.01)
*H04L 12/56* (2006.01)

(52) U.S. Cl. .................................. 370/401; 709/203
(58) Field of Classification Search .................. None
See application file for complete search history.

(56) References Cited

U.S. PATENT DOCUMENTS

| | | | |
|---|---|---|---|
| 5,394,561 A | 2/1995 | Freeburg | |
| 5,586,165 A | 12/1996 | Wiedeman | |
| 6,256,497 B1 | 7/2001 | Chambers | |
| 6,535,731 B1 | 3/2003 | Pillekamp et al. | |
| 6,859,652 B2 | 2/2005 | Karabinis et al. | |
| 7,181,161 B2 | 2/2007 | Karabinis | |
| 2002/0186683 A1* | 12/2002 | Buck et al. | 370/352 |
| 2003/0123481 A1* | 7/2003 | Neale et al. | 370/466 |
| 2003/0217132 A1* | 11/2003 | Batten et al. | 709/223 |
| 2005/0018689 A1* | 1/2005 | Chudoba | 370/395.5 |
| 2005/0021610 A1* | 1/2005 | Bozionek et al. | 709/203 |
| 2007/0110083 A1* | 5/2007 | Krishnamoorthy et al. | 370/401 |

\* cited by examiner

*Primary Examiner* — Chirag G Shah
*Assistant Examiner* — Minh-Trang Nguyen

(57) ABSTRACT

Systems and methods of providing data from a first network to a second network are provided. When a first packet is received from the first network, it is determined whether the first packet includes state information. When the packet includes state information, a packet is transmitted to the first network in response to receipt of a first packet. The first packet can then be transmitted to the second network. The method can also involve removing the state information from the first packet prior to transmission to the second network and conversion of a transport layer of the first packet from a first protocol to a second protocol prior to transmission to the second network.

17 Claims, 4 Drawing Sheets

SYSTEM AND METHOD OF TRANSFERRING COMMUNICATIONS BETWEEN NETWORKS

BACKGROUND OF THE INVENTION

There are a variety of different types of communication networks, such as terrestrial-based wireless communication networks and satellite communication networks. Terrestrial-based wireless communication networks are commonly known as cellular networks because the network topology revolves around a number of base stations each supporting wireless communication units within a defined region known as a cell. Compared to terrestrial-based wireless communication networks, satellite communication networks have a large number of drawbacks, including the expense of the satellites and the associated handsets. An additional problem with satellite communication networks is the large latency associated with the time required for information to travel between a land-based communication device and the satellite. This delay is then repeated for the transmission of the communication from the satellite back down to another communication device. The delay introduced due to the satellite communication links begins on the order of 500 ms and can exceed 2,500 ms.

SUMMARY OF THE INVENTION

The roundtrip delay time for satellite communications has always been known as a significant obstacle to the adoption of satellite communication networks for voice communications. It has been recognized that this roundtrip delay can also be problematic for data communications. Specifically, stateful packet-based protocols require the exchange of state information between the sending and receiving device in order to operate efficiently. If too large of a delay is introduced into the exchange of state information, a much reduced throughput of packets between a sending and receiving device can result. Thus, it is difficult to exchange communications between two networks in which one network employs a packet-based stateful protocol with a second network that does not have sufficient performance to support stateful packet-based protocols, such as satellite communications networks.

Accordingly, exemplary embodiments of the present invention provide systems and methods of providing data from a first network to a second network. When a first packet is received from the first network, it is determined whether the first packet includes state information. When the packet includes state information, a packet is transmitted to the first network in response to receipt of a first packet. The first packet can then be transmitted to the second network. The method can also involve removing the state information from the first packet prior to transmission to the second network and conversion of a transport layer of the first packet from a first protocol to a second protocol prior to transmission to the second network.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Figure 1:
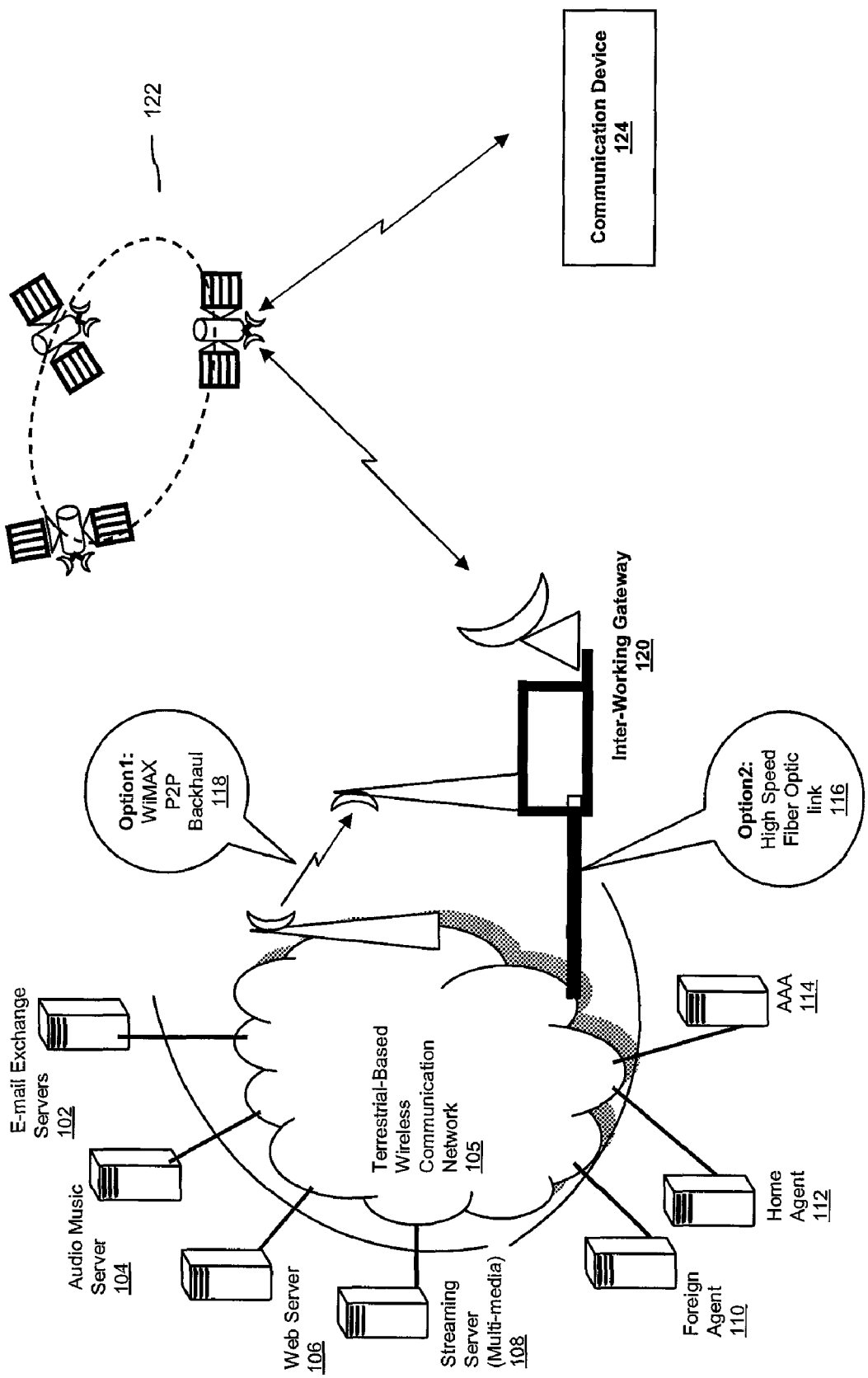
FIG. 1 is a block diagram of an exemplary system in accordance with the present invention.

FIG. 1 is a block diagram of an exemplary system in accordance with the present invention. Exemplary embodiments provide an inter-working gateway 120 to couple a terrestrial-based wireless communication network 105, such as WiMAX network, to a communication device 124 via a satellite network 122. Communication device 124 can be any type of communication device that is capable of receiving signals from a satellite network, and in some cases can be capable of transmitting signals to the satellite network. For example, the communication device can be a stand-alone communication device (such as a handset, personal media equipment, computer and/or the like) or can be integrated with another device (such as being integrated into a motor vehicle, home appliance and/or the like). Communication device 124 can also include functionality for exchanging communications with terrestrial-based wireless communication network 105.

The terrestrial-based communication network includes a number of application servers, such as an e-mail exchange server 102, audio music server 104, web server 106, and streaming multi-media server 108. The present invention is not limited to the application servers illustrated in FIG. 1, and can include other types of application servers, such as dispatch communication (also referred to as push-to-talk communication), other types of data services, telematics, geo-location services and/or the like. These services can be provided on a unicast (i.e., packets addressed to a particular receiver), multicast (i.e., packets addressed to a number of receivers) or broadcast (i.e., packets that are not addressed to any particular receiver) basis. It should be recognized that even in a broadcast scenario, the packets can be encrypted such that only particular receivers are able to decode the received packets.

One exemplary service that can be provided is streaming audio and/or video. This type of streaming media can originate from a web server, audio music server or streaming media server located on the Internet, a media head-end (such as a broadcast television or radio head-end, cable system head-end and/or the like), and/or can originate from a server located at a wireless communication network service provider's facilities.

The terrestrial-based communication network can also include a foreign agent 110, home agent 112 and an authentication, authorization and accounting server 114 (AAA). The terrestrial-based communication network is coupled to gateway 120 via a wireless backhaul communication link 118 or a hard-wired communication link, such as fiber optic link 116. The gateway 120 of the present invention allows communication device 124 to access application servers and other services provided by the terrestrial-based communication network 105, even when device 124 is not located within radio frequency range of network 105. Instead, communication device 124 can be located in an area in which it can only receive communications from a satellite communication network 122, and data for the applications or other services of terrestrial-based communication network 105 are forwarded by gateway 120 via satellite network 122. It should be recognized, however, that communication device 124 can exchange communications with the satellite communication network even when within the coverage area of a terrestrial-based.

Figure 2:
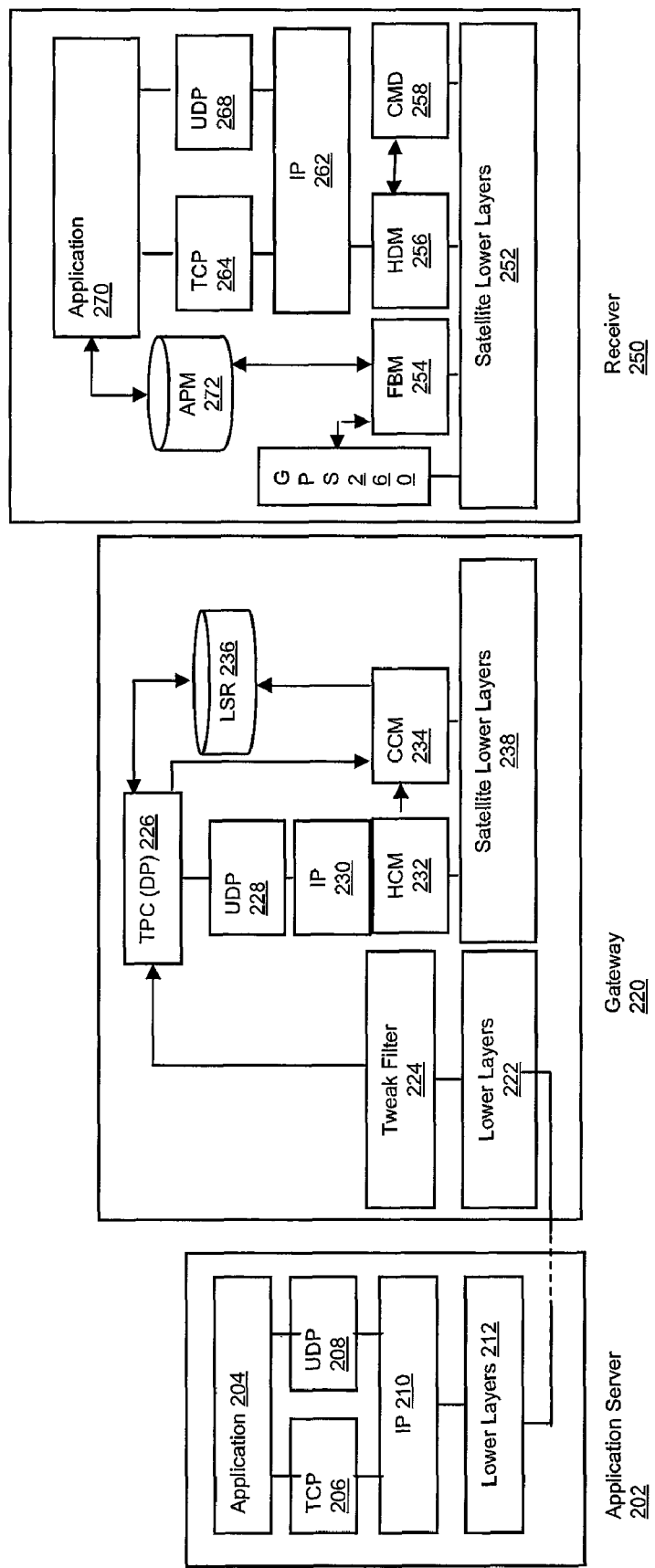
FIG. 2 is a detailed block diagram of an application server, gateway and receiver in accordance with exemplary embodiments of the present invention.

FIG. 2 is a detailed block diagram of an exemplary system in accordance with the present invention. The system includes application server 202, gateway 220, and receiver 250. Application server 202 can be any of the application servers described above, and receiver 250 can be any type of communication device described above. Application server 202 is illustrated with its various protocol layers, including application layer 204, a transport layer that includes transmission control protocol (TCP) 206 and universal datagram protocol (UDP) 208, IP layer 210, and lower protocol layers 212. Data packets that are formatted in accordance with TCP or UDP protocols are transferred from application server 202 to gateway 220, which are initially received by lower protocol layers 222 of gateway 220.

TCP is a stateful protocol in which packets contain information about the state of the communication session between the sender and receiver, whereas UDP is a stateless protocol in which the packets do not include state information. Moreover, TCP is a synchronous protocol that provides flow control mechanisms, whereas UDP is an asynchronous protocol that provides no flow control mechanisms. Exemplary embodiments of the present invention provide a tweak filter that accounts for these differences between TCP and UDP protocols in order to provide optimal transfer of services from a terrestrial communication network to communication receiver by way of a satellite communication network.

The data packets are passed from lower layers 222 to tweak filter 224 which examines the transport layer of the packets to determine whether the packets are formatted according to a stateful or stateless protocol. For data packets of stateless protocols, such as UDP, tweak filter 224 passes the packets unmodified to transport protocol conversion (TPC) dynamic packetizer 226. For stateful data packets, such as TCP data packets, tweak filter 224 performs spoofing to application server 202 in order to maintain the data packet state. Specifically, as part of TCP protocol, acknowledgements are returned from a receiver to the sender to confirm successful receipt of the packets. Accordingly, tweak filter 224 will send such acknowledgement packets with state information, even though the ultimate receiver 250 has not yet received the packets. Moreover, TCP flow control includes a so-called "slow start" mechanism where a few packets are initially sent and the sender increases or decreases the rate at which packets are sent in response to the rate at which acknowledgements are received. Thus, tweak filter 224 will control the timing of sending the acknowledgement packets to application server 202 in order to optimize the transmission of data packets from application server 202 to gateway 220. Because tweak filter 224 determines whether a packet is formatted in accordance with a stateful protocol by examining the transport layer protocols, and the filter does not need to interpret any information from the application layer.

For stateful packets, tweak filter 224 forwards the payload data of the packet to TPC 226, whereas for stateless packets, tweak filter 224 forwards the entire packet to TPC 226. Upon receipt of the packets, TPC 226 examines the link status record (LSR) 236 in order to determine the size of the datagram for sending to a particular satellite beam. Context and control module (CCM) 234 updates LSR 236 with the datagram size. Accordingly, the present invention can dynamically increase/decrease the data size of the payload sent over the satellite link based on information stored in LSR 236. LSR 236 estimates the datagram size for transmission based on measurements of data exchange with the satellite communication network during a particular period of time.

Satellite lower layers 238 subject each stream to header compression to eliminate redundancy in headers for the particular stream, and CCM 234 creates control messages with context information regarding the header compression and stream-related parameters. As described above, the present invention can support multicast and broadcast packet streams. Accordingly, this control message will be broadcast at regular intervals, or on a request basis, through a control channel, which allows new listeners, such as satellite receivers who just tuned their receiver to a particular stream, to build the header decompression context. CCM 234 also captures feedback control messages from active satellite receivers, where these messages contain the mapped geographic location information and status of the link delay, error rate (packet/frame). CCM 234 unpacks the feedback control messages and estimates the performance parameter table per stream, where this table contains the stream information, mapped geo-location information, satellite beam-related information, satellite status-like delay experienced, error rate, and the like. Based on this information, CCM module 234 determines the comprehensive correction parameter for each stream and updates the link status record 236.

Receiver 250 includes satellite lower layers 252, feedback control module (FBM) 254, header decompression module (HDM) 256, control message decoding (CMD) module 258, GPS receiver 260, IP layer 262, transport layer that includes TCP 264 and UDP 268, application layer 270, and application parameter module (APM) 272.

When receiver 250 is tuned to a particular streaming channel, the receiver can synchronize with the ongoing stream in a number of ways. One technique is for the receiver to send current context request messages in order to construct the header compression context. Once a response message is received, context decoding module 258 constructs the context for the ongoing stream and links the context with incoming compressed streams. Another alternative is for the receiver to listen to the broadcast control channel in order for the context decoding module 258 to receive and unpack a context control message, and thus construct the context for the ongoing stream and link the context with incoming compressed streams.

Header decompression module 256 modulates and reproduces the header with the actual transport protocol based on the context control message received for the stream, i.e., translated TCP streams will be reverted back for application transparency. Thus, application layer 270 can receive stateful messages both while within range of the terrestrial-based wireless communication network and within range of the satellite-based wireless communication network. APM 272 collects the performance parameters from both the application layer and lower layers. These parameters include delay and error rate. If key parameters hit maximum or minimum boundary values, then APM 272 triggers the feedback module 254 to send the feedback to gateway 220. FBM 254 interfaces with GPS module 260 in order to include the current location of receiver 250 in the feedback messages.

It should be recognized that the various components of the application server 202, gateway 220 and receiver 250 can be implemented in hardware and/or software. The hardware can include a processor such as a microprocessor, field programmable gate array (FPGA) and/or an application specific integrated circuit (ASIC). When the hardware is a processor, then the various functionality described above can be processor-executable code loaded from a memory.

Figure 3:
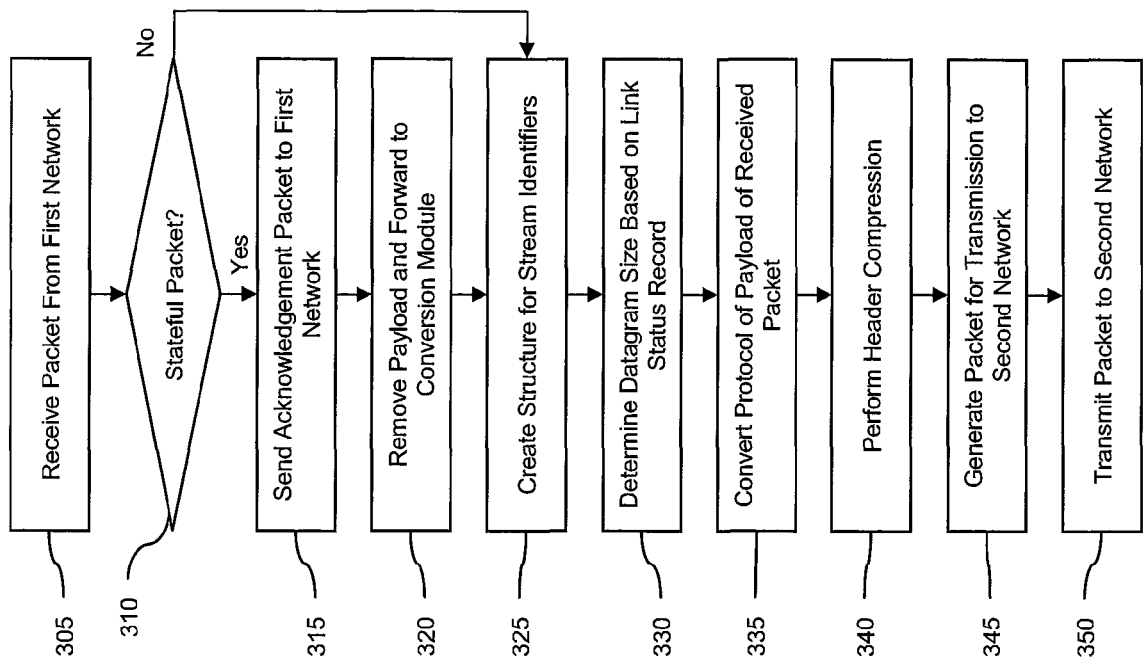
FIG. 3 is a flow diagram of an exemplary method in accordance with the present invention.

FIG. 3 is a flow diagram of an exemplary method in accordance with the present invention. Initially, gateway 220 receives a packet from the terrestrial-based wireless communication network (step 305). Tweak filter 224 examines the transport layer to determine whether the packet is associated with a stateful protocol or a stateless protocol (step 310). When the packet is associated with a stateful protocol ("Yes" path out of decision step 310), then tweak filter 224 sends an acknowledgement packet to application server 202 in the first network (step 315). Tweak filter 224 then removes the payload from the packet and forwards it to TPC 226 (step 320).

After removing the payload of a stateful packet or when the packet is not a stateful packet ("No" path out of decision step 310), then TPC 226 creates a structure for the stream identifiers (step 325) and determines the datagram size based on information stored in LSR 236 (step 330). TPC 226 converts the protocol of the payload (when the received packet is a stateful packet) (step 335), header compression module (HCM) 232 performs header compression for the packet (step 340) and satellite lower layers 238 generate the packet for transmission to the satellite network and transmit the packet to that network (steps 345 and 350).

Figure 4:
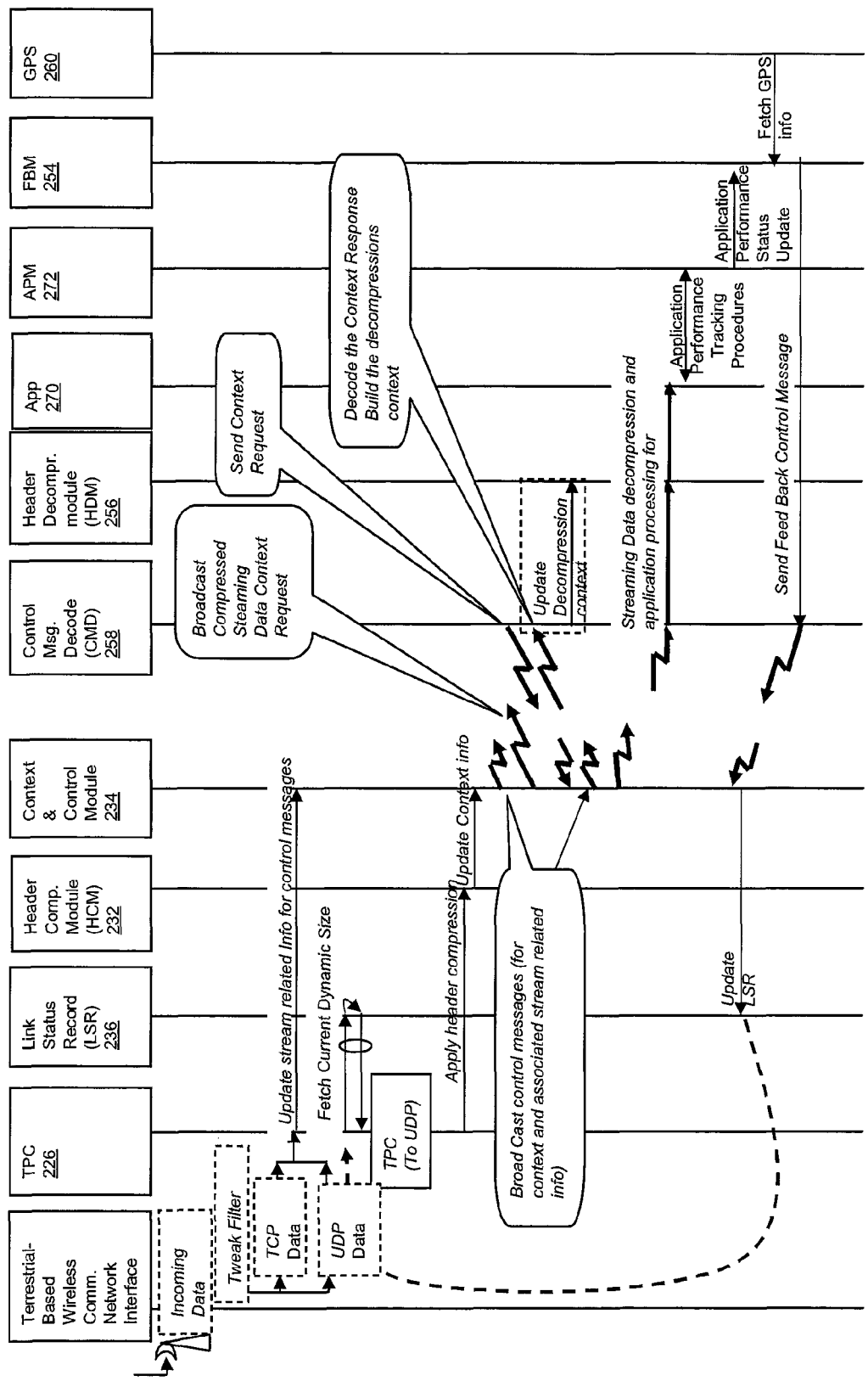
FIG. 4 is an exemplary call flow diagram in accordance with the present invention.

FIG. 4 is a call flow diagram of an exemplary method in accordance with the present invention. When the tweak filter 224 of gateway 220 receives incoming stateful packets (TCP packets) or stateless packets (UDP packets), TPC 226 sends an update of stream-related information to be used for control messages to context and control module 234. TPC 226 also obtains the current dynamic datagram size from link status record 236. For TCP packets, TPC 226 converts the packet into UDP packets, sends the packet to header compression module 232 for header compression, and module 232 updates the context information with context and control module 234.

Context and control module 234 broadcasts compressed streaming data context requests across the satellite network, which can be received by receiver 250. Control message decoder 258 of receiver 250 sends a context request to context and control module 234 which replies with a decode context response in order for receiver 250 to build the decompression context. Based on that response, control message decoder 258 updates the decompression context with header decompression module 256. Gateway 220 then sends the data packets to satellite-based communication network, which forwards to them to receiver 250. Accordingly, receiver 250 performs decompression and application processing, by way of modules 256 and 270. Application performance module 272 receives information from application 270 in order to track the performance of the application, and forwards application performance status updates to FBM 254. FBM 254 receives the receiver's current geographic information from GPS 260, and then sends feedback control messages by way of the satellite communication network to gateway 220. Context and control module 234 receives these messages and updates the link status record 236 based upon the feedback control message. As illustrated by the dashed line in FIG. 4, the updated information in the link status record is used to control the current datagram size.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of providing data from a first network to a second network, the method comprising:

receiving, by a gateway node, a first packet from the first network;

determining, by the gateway node, whether the first packet includes state information;

converting, by the gateway node, TCP protocol transport layer information of the first packet into User Datagram Protocol (UDP) transport layer information if the first packet includes TCP protocol-specific state information;

generating, by the gateway node, a control message including context information regarding the conversion of TCP protocol transport layer information into UDP transport layer information if the first packet includes TCP protocol-specific state information;

transmitting, by the gateway node to the first network, a TCP protocol-specific state-related response in response to receipt of the first packet if the first packet includes TCP protocol-specific state information which requires a TCP protocol-specific state-related response;

transmitting, by the gateway node to the second network, the converted first packet to the second network if the first packet includes TCP protocol-specific state information, wherein the transmitting occurs subsequent to the transmitting of the TCP protocol-specific state-related response if the first packet includes TCP protocol-specific state information which requires a TCP protocol-specific state-related response;

transmitting, by the gateway node to the second network, the generated control message including context information regarding the conversion of TCP protocol transport layer information into UDP transport layer information if the first packet includes TCP protocol-specific state information; and transmitting, by the gateway node to the second network, the first packet if the first packet does not include TCP protocol-specific state information.

2. The method of claim 1, further comprising:

removing, by the gateway node, the TCP protocol-specific state information from the first packet prior to transmission to the second network if the first packet includes TCP protocol-specific state information.

3. The method of claim 1, wherein the TCP protocol-specific state-related response required in response to receipt of the first packet is an acknowledgement receipt packet.

4. The method of claim 3, wherein the TCP protocol-specific state-related response required in response to receipt of the first packet includes TCP protocol-specific state information associated with TCP protocol-specific state information in the first packet.

5. The method of claim 1, wherein determining whether the first packet includes TCP protocol-specific state information comprises:

examining transport layer protocols of the first packet.

6. The method of claim 1, wherein determining whether the first packet includes TCP protocol-specific state information is performed independent of application layer information in the first packet.

7. The method of claim 1, further comprising:

accessing a link status record to determine a datagram size for transmission of the converted first packet to the second network, wherein the converted first packet has a size equal to the determined datagram size.

8. The method of claim 1, wherein the first packet is part of a stream of packets received from an application server.

9. The method of claim 8, wherein the stream of packets is associated with audio information, video information, located-based services information, or electronic mail information.

10. The method of claim 1, wherein the first network is a terrestrial wireless network and the second network is a satellite wireless network.

11. A hardware gateway node that is coupled between a first network and a second network, the gateway comprising:
a first communication interface to communicate with the first network;
a second communication interface to communicate with the second network;
a protocol processing unit configured to implement Transmission Control Protocol (TCP) protocol layers and process a first packet received by the first communication interface from the first network;
a filter processing unit configured to determines whether the first packet includes TCP protocol-specific state information;
a transport protocol conversion processing unit configured to convert TCP protocol transport layer information of the first packet into User Datagram Protocol (UDP) transport layer information if the first packet includes TCP protocol-specific state information;
a first transmission unit configured to transmit the TCP protocol-specific state-related response to the first network if the first packet includes TCP protocol-specific state information which requires a TCP protocol-specific state-related response; and
a second transmission unit configured to transmit the converted first packet to the second network if the first packet includes TCP protocol-specific state information, and to transmit the first packet to the second network if the first packet does not include TCP protocol-specific state information, wherein the transmitting occurs subsequent to the transmitting of the TCP protocol-specific state-related response if the first packet includes TCP protocol-specific state information which requires a TCP protocol-specific state-related response.

12. The hardware gateway node of claim 11, wherein the filter removes the TCP protocol-specific state information from the first packet prior to transmission to the second network if the first packet includes TCP protocol-specific state information.

13. The hardware gateway node of claim 11, wherein the filter processing unit determines whether the first packet includes TCP protocol-specific state information by examining transport layer protocols of the packet.

14. The hardware gateway node of claim 11, wherein the filter processing unit determines whether the first packet includes TCP protocol-specific state information independent of application layer information in the first packet.

15. A system comprising:
an application server coupled to a terrestrial-based wireless communication network;
a communication device that receives signals from a satellite-based communication network; and
a gateway coupled to the terrestrial-based wireless communication network and the satellite-based communication network in order to exchange packets between the application server and the communication device through the terrestrial-based wireless communication network and the satellite-based communication network, the gateway comprising
a filter processing unit configured to determine whether a first packet received from the application server through the terrestrial-based wireless communication network is formatted in accordance with Transmission Control Protocol (TCP),
wherein, when the first packet is formatted in accordance with transmission control protocol (TCP), a response packet is transmitted to the terrestrial-based wireless communication network in response to receipt of the first packet, a transport layer of the first packet is converted from TCP to universal control protocol (UDP), and the converted packet is transmitted to the satellite-based communication network,
wherein the response packet transmitted to the first network in response to receipt of the first packet is transmitted prior to the hardware gateway node receiving a response packet from the second network in response to receipt of the converted packet, and
wherein at least one of the application server, the communication device, and the gateway is implemented in hardware and includes processor.

16. The system of claim 15, wherein the communication device is integrated in a motor vehicle.

17. The system of claim 15, wherein the application server is one of a streaming media server, web server, audio music server or e-mail server.

* * * * *